CONTROLLED SWITCH STORE FOR EXTENDING SAMPLING TIME INTERVALS

Filed May 31, 1968

INVENTORS A. J. DONATO
P. R. MILLER
BY J. S. Cubert
ATTORNEY 3,540,009
CONTROLLED SWITCH STORE FOR EXTENDING SAMPLING TIME INTERVALS Anthony J. Donato and Paul R. Miller, Gahanna, Ohio, assignors to Bell Telephone Laboratories, Incorporated, Murray Hill and Berkeley Heights, N.J., a corporation of New York Filed May 31, 1968, Ser. No. 733,399
Int. Cl. G11c *11/34;* H03k *3/26*
U.S. Cl. 340—173 10 Claims

ABSTRACT OF THE DISCLOSURE

A store circuit includes a group of controlled switches to store received information for a predetermined time. Each controlled switch is connected to a source that generates a pulse when information is in the register. The generated pulse is applied to each controlled switch after information is transferred thereto to maintain the information stored in the switch for the duration of the pulse. The state of each controlled switch is sampled in this time intedval and the stored information is transferred to a utilization device.

BACKGROUND OF THE INVENTION

Our invention relates to signal transmission and, more particularly, to signal receiving arrangements employing storage apparatus.

In communication systems such as modern telephone systems, it is often necessary to detect the presence of incoming signaling information and to direct such signaling information to appropriate switching apparatus. Where electronic switching is employed, the signal presence detection can be efficiently accomplished by periodically scanning the state of the receiving apparatus. The detected signaling information may then be transmitted to switching circuitry. Both the scanning and signal transmission may be under the control of signal processing equipment. The scanning signals from the signal processing equipment must be applied to the receiving apparatus repetitively at a rate which ensures the detection of successively applied signals. This requires an interruption of other operations of the processing equipment so that the necessary scanning signals can be generated and sent to the associated receivers. A high scanning rate requires greater processing time and restricts the availability of the processing equipment for other purposes.

In a telephone system where signaling information is received at a particular rate, the scanning signals must be applied to the receiver to detect all possible incoming signals. If it is also required that an incoming signal be present for a predetermined time before it can be detected, the scanning rate must be further increased. The delayed detection of the signal after a predetermined time is useful when the incoming signal must be distinguished from noise. Consequently, a substantial portion of the incoming signal time period may elapse before the signal is detected. One way of reducing the scanning rate is to extend the duration of the transmitted signal information. But this slows down the operation of the signaling arrangements and reduces the system efficiency. A second way to reduce scan rate is to temporarily store the incoming signal. This storage permits the scanning signals to be applied less frequently.

BRIEF SUMMARY OF THE INVENTION

Our invention is a store incorporating a group of controlled switches to temporarily store signals received from a signal register. One terminal of each controlled switch is connected through a first unidirectional conducting device to one of several lines from the register and through a second unidirectional conducting device to a pulse source activated by the receipt of signal information in the register. The first unidirectional conducting device permits the connected controlled switch to be switched from a first state to a second state if the associated register signal exceeds the controlled switch threshold voltage. The second unidirectional conducting device permits a pulse from the pulse source to be applied to the previously switched controlled switch to maintain it in its second state for the duration of the pulse. The other terminal of each controlled switch is connected to a circuit which responds to the state of the controlled switch when a sampling signal is applied. The information stored in the controlled switch is then transferred to a utilization circuit.

According to one aspect of our invention, the controlled switches are two terminal PNPN devices operative in a high impedance state and a low impedance state and the circuit to which the sampling signal is applied responds to the current through the connected PNPN device to transfer information stored in the PNPN devices.

According to another aspect of our invention, the first and second unidirectional conducting devices are diodes which form a gating circuit responsive to voltage signals of a predetermined polarity and the signal from the pulse source is delayed to distinguish between signal information and noise.

In an illustrative embodiment of our invention signals are coupled to detector circuits which generate a plurality of binary signals and couple the binary signals via a first set of diodes to a group of PNPN devices previously reset to their high impedance states. In response to the binary signals, the PNPN devices are selectively switched to their low impedance state. A signal from the detector circuit is also applied to a timing pulse generator which operates after a predetermined time delay to retain the PNPN devices in their altered states by applying a holding current pulse thereto. Each PNPN device is connected to an associated ferrod to control the state thereof. These ferrods are scanned during the application of the holding pulse to transfer the information stored in the PNPN devices to a utilization device.

DETAILED DESCRIPTION

Figure 1:
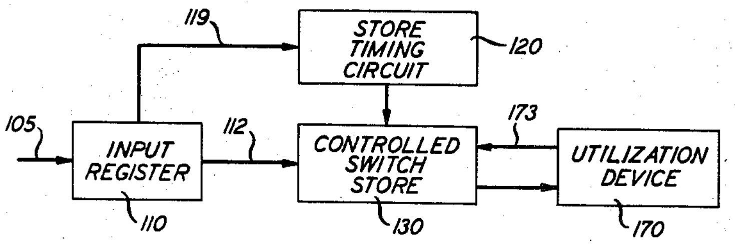
FIG. 1 depicts a block diagram of an embodiment of our invention.

FIG. 1 shows a circuit, which may operate as a signal receiver, wherein signals from an input register are temporarily stored and transferred to a utilization device by means of a scanning arrangement. Referring to FIG. 1, input register 110 receives a plurality of signals from cable 105 and converts these received signals into binary signals. These binary signals are applied via cable 112 to controlled switch store 130 to switch selected controlled switches to their low impedance states in accordance with the voltages of the applied binary signals. The controlled switches may be semiconductor devices such as PNPN devices. The switched PNPN devices supply current to scannable devices such as ferrods in store 130. In this way the signaling information from register 110 is made available for an extended period of time to be scanned by a signal from utilization device 170.

A signal is also applied from register 110 to timing circuit 120 via lead 119 after a predetermined time delay. Timing circuit 120 applies holding current to each controlled switch of store 130 and also applies a pulse to one scannable device in store 130 which indicates that signaling information is present in the store. Utilization device 170 repetitively applies scanning signals to store 130 to determine the presence of information in the store. If a scanning signal occurs during the pulse from timing circuit 120, the state of each controlled switch is scanned and transmitted to utilization device 170. In accordance with our invention, the pulse from timing circuit 120 extends the duration of the signals from register 110 in the form of a code in the controlled switches of store 130. The effectively extended signal duration, made possible by store 130, permits a decrease in the rate at which the scanning signals are applied from device 170 so that device 170, which may include processing equipment, is available for other uses in the extended period between successive scans.

Figure 2:
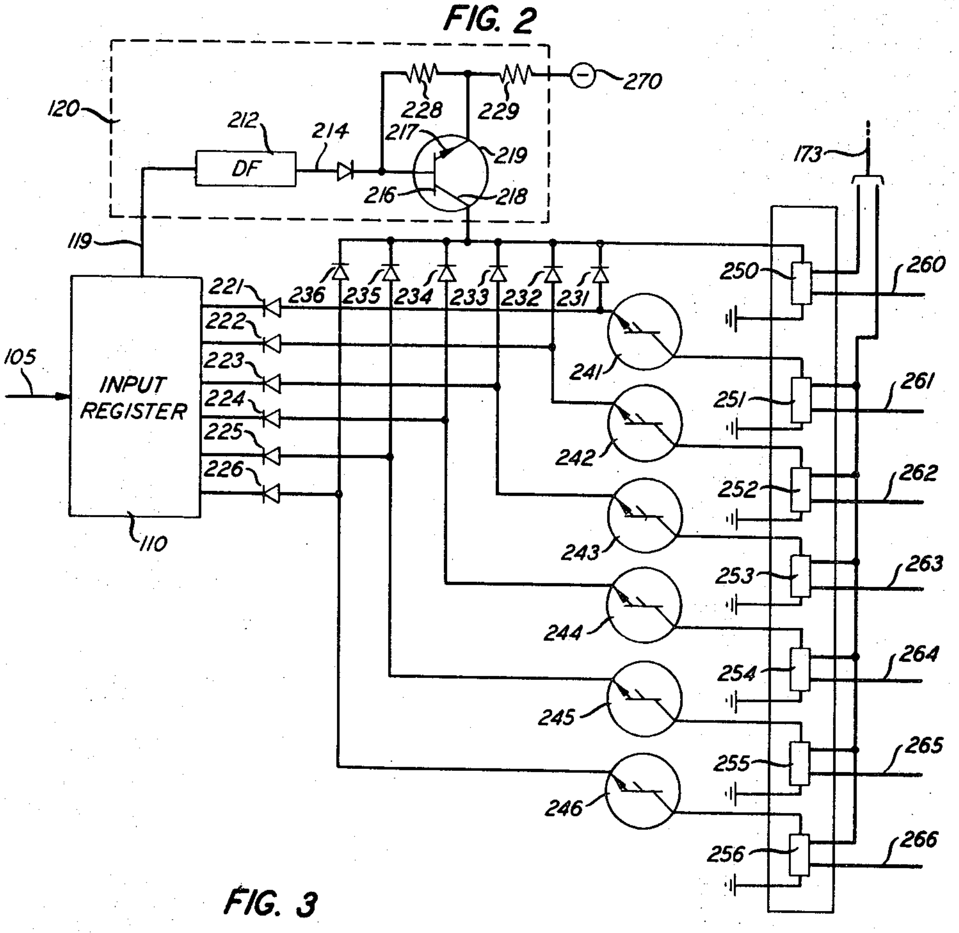
FIG. 2 depicts a detailed schematic diagram of the embodiment of our invention shown in FIG. 1.

FIG. 2 shows a detailed schematic diagram of an embodiment according to the circuit of FIG. 1. In FIG. 2 incoming signals from cable 105, which may be multifrequency signals well known in the telephone art, are applied to register 110. These signals cause binary signals to appear at the cathodes of unidirectional conducting diodes 221 through 226, in accordance with a code such as the well known two-out-of-six code. Register 110 is arranged so that the binary signals therefrom are zero volt signals or negative signals. The negative signals are applied to two selected diodes and only these two diodes conduct. It is to be understood that the circuit of FIG. 1 can readily be rearranged so that positive pulses cause the diodes to conduct.

PNPN diodes 241–246 form a temporary store for the applied code signals. In the absence of a predetermined negative voltage, a PNPN device is in its high impedance state and substantially no current passes therethrough. If a predetermined negative signal is applied to the cathode of a diode such as diode 221, it causes a negative voltage to be applied to the connected terminal of PNPN device 241. This predetermined negative voltage is selected to exceed the threshold switching voltage of device 241, so that device 241 conducts and causes a current to flow through ferrod 251 which is connected to the anode of device 241.

A ferrod, as is known in the art (Bell System Technical Journal, vol. 3, September 1964, p. 2257), is a magnetic device arranged to provide magnetic coupling of pulses from a first conductor to a second conductor in response to current flowing through a control winding. The ferrod may comprise an elongated ferrite stick having a transverse aperture through which the first and second conductors pass. The control winding forms a solenoid around the ferrite stick and current therethrough causes the stick to saturate so that magnetic coupling between the first and second conductors is prevented. In the absence of current through the control winding, pulses applied to the first conductor cause pulses to appear on the second conductor.

Without diode 231 or transistor 219, the removal of the negative signal from register 110 causes device 241 to revert to its high impedance state so that ferrod 251 is saturated only during the period of the applied signal from register 110. If, however, diode 231 conducts during the time device 241 is in its low impedance state, device 241 is held in its low impedance state as long as the current through diode 231 exceeds the holding current value for device 241. In this way, removal of the signal from register 110 leaves device 241 in its low impedance state for an extended period of time during which current flows through ferrod 251.

A predetermined time after signals are received in register 110 from cable 105, a signal is coupled via lead 119 to the input of delay flop 212. The operation of delay flop 212 may be advantageously delayed to distinguish between transient noise on cable 105 from signals thereon. The output of delay flop 212 is a positive going signal, the duration of which pulse determines the storage period of PNPN devices 241–246. Transistor 219 is rendered conductive at the beginning of this period so that current can flow through ferrod 250 and through selected ones of diodes 231–236 provided that the associated PNPN devices had been previously switched to their low impedance states. This is so because the voltage at collector 218 during the conduction of transistor 219 does not exceed the switchover voltage threshold of the PNPN devices and therefore cannot switch the PNPN devices. In this way only selected PNPN devices in FIG. 2 are maintained in their low impedance states for the time period during which transistor 219 is conducting.

Cable 173 from utilization device 170 transmits periodic scanning signals to ferrod 250. The current passing through ferrod 250 from ground to collector 218 magnetically saturates ferrod 250 so that on the application of the sampling pulse from cable 173 no pulse is coupled therefrom to line 260. The absence of a pulse on line 260 in response to a sampling pulse indicates information is stored in store 130. If ferrod 250 is unsaturated, a pulse is applied to line 260 to indicate that no information is stored in the controlled switches of store 130. The absence of a pulse on line 260 is detected in utilization device 170 and sampling signals from device 170 are then applied by cable 173 to each of ferrods 251–256 of FIG. 2 so that these ferrods can be interrogated. The sampling pulses required for the operation of ferrods 251–256 may be generated by utilizing a magnetic switching device inverter such as described in United States patent 2,949,504 which issued Aug. 16, 1960 to M. Rubinoff. This inverter operates to provide pulse on its output terminal only in the absence of a pulse on its input terminal. In utilization device 170, the input terminal of the magnetic inverter is coupled to line 260. When ferrod 250 is saturated, a sampling pulse generated by a clock source in utilization device 170 is prevented from appearing on line 260. The absence of a pulse on line 260 causes the aforementioned magnetic inverter to produce a pulse on its output terminal in response to a clock pulse generated in utilization device 170 which output pulse is coupled to ferrods 251–256 via cable 173. It is to be understood that the sampling pulse for ferrods 251–256 may be generated by semiconductor arrangements or numerous other devices well known in the art. If the PNPN device associated with a particular ferrod is in its low impedance state, the coupling of pulses through the ferrod is prevented. An output signal responsive to the sampling signal is transmitted from each ferrod associated with a high impedance PNPN to device 170. In this way, according to our invention, the code stored in the PNPN devices for the period determined by delay flop 212 is transmitted to utilization device 170 during its normal scanning operation and the storing of the code in the PNPN devices reduces the repetition rate of the sampling pulses from device 170.

Figure 3:
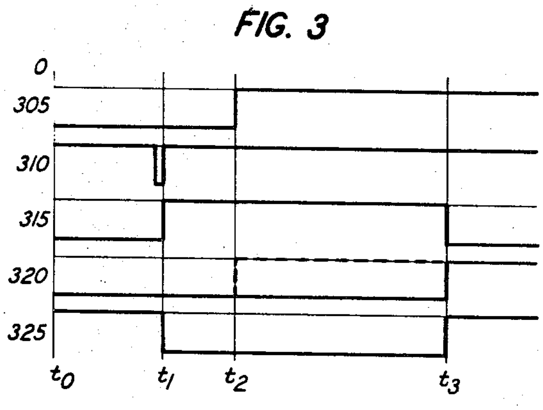
FIG. 3 shows waveforms useful in illustrating the operation of the embodiment of FIG. 2.

FIG. 3 shows waveforms which illustrate the operation of the circuit of FIG. 2. Waveform 305 appears at the cathodes of two of diodes 221 through 226 when register 110 responds to input signals from cable 105. This provides signals in the two-out-of-six code. It is to be understood that other codes known in the art may be used. Waveform 305 goes negative at time $t_0$ and allows two diodes to conduct. Assume these diodes are 221 and 222. The conduction of diode 221 permits a negative voltage to be applied to device 241. The applied negative voltage exceeds the threshold voltage of the device and causes it to switch from its high impedance state to its low impedance state. The voltage at the cathode of device 241 is shown in waveform 320 where the lower value of the waveform indicates the PNPN device is in its low impedance state and current flows therethrough. Delay flop 212 is not operated until $t_1$ so that ferrod 250 is unsaturated between $t_0$ and $t_1$. Thus, sampling pulses applied to ferrod 250 via cable 173 between $t_0$ and $t_1$ are applied to line 260. Therefore, until $t_1$, ferrods 251 through 256 are not sampled. This is so because device 170 transmits pulses to sample ferrods 251–256 only in the absence of a signal from just sampled ferrod 250.

At $t_1$, the negative pulse shown on waveform 310 is applied to operate delay flop 212. Delay flop 212 is then activated and produces a positive going pulse at base 216 of transistor 219. This positive going pulse is shown in waveform 315. Transistor 219 is normally nonconductive since base 216 is connected to emitter 217 via resistor 228, and emitter 217 is returned to negative supply voltage 270 via resistor 229. At $t_1$ transistor 219 conducts and causes current to flow through ferrod 250 and diodes 231 and 232. Diodes 233–236 are substantially nonconductive because PNPN devices 243–246 are in their high impedence states. PNPN devices 241 and 242 are in their low impedance states. The current flowing through diode 231 is sufficient to hold PNPN device 241 in its low impedance state and to saturate ferrod 251. In like manner, the current flowing through diode 232 maintains PNPN device 242 in its low impedance state and causes ferrod 252 to saturate. The remaining PNPN devices are in their high impedance state and their associated ferrods are unsaturated because the voltage applied through diodes 233–236 are not sufficient to switch these PNPN devices to their low impedance states.

In the absence of the pulse from delay flop 212, all PNPN devices would be switched back to their high impedance states at $t_2$ and the interval during which the signals from register 110 could be sampled would extend only between $t_1$ and $t_2$. This is shown by the dashed portion of waveform 320. Scanning signals would have to be applied between $t_1$ and $t_2$. The holding pulse of waveform 325 which appears at collector 218 permits the sampling period to be extended until $t_3$. Because of the extended sampling period, the repetition rate of the sampling pulses may be significantly reduced and utilization device 170, which is used to generate the sampling pulses, may be otherwise employed for a greater period of time. A first occurring sampling pulse applied to ferrod 250 at any time in the interval between $t_1$ and $t_3$ prevents a pulse from appearing on line 260. This indicates the presence of information in store 130. Device 170 in turn applies second occurring sampling pulses to ferrods 251 through 256. The second occurring sampling pulses applied to the unsaturated ferrods 253–256 then cause signals to be transmitted from the unsaturated ferrods to device 170.

Our invention has been described with reference to a particular illustrative embodiment. It is to be understood, however, that numerous modifications and other arrangements may be devised by those skilled in the art without departing from the spirit and scope of our invention.

What is claimed is:

1. A signal receiver for converting a short duration incoming signal into a plurality of binary output signals of longer duration and corresponding to a code, said receiver comprising a plurality of two terminal controlled switches at whose output terminals the binary output signals appear, a pulse generator for generating a pulse of a predetermined duration, a plurality of first diode means each connecting said pulse generator to the input terminal of one of said switches, a register for receiving said incoming signals and applying short duration pulses to the input terminals of selected ones of said switches in accordance with the incoming signals and for applying a signal to said pulse generator after the application of said short duration pulses to said switch input terminals, and a plurality of second diode means each connecting said register with one of said switch input terminals.

2. A signal receiver in accordance with claim 1 further comprising storage means individually connected to each of said switch output terminals to be controlled thereby for sampling of their state.

3. A signal receiver in accordance with claim 2 further comprising storage means directly connected to said pulse generator to be controlled thereby for sampling of its state.

4. A signal store comprising a plurality of PNPN devices having first and second terminals, each normally operative in a high impedance state and operative in a low impedance state responsive to signals exceeding a predetermined threshold voltage, means for selectively applying signals to the first terminal of each of said devices to selectively switch said devices to said low impedance state including means responsive to incoming signals for selectively generating signals exceeding said threshold voltage and unidirectional conducting means connected between said signal generating means and each first terminal, means responsive to the occurrence of said incoming signals for generating a pulse for a predetermined time interval, means for applying said pulse to each first terminal for maintaining each selected switching device in said low impedance state during said predetermined time interval including unidirectional coupling means connected between said pulse generating means and each first terminal, and means including a plurality of coupling means connected to the second terminal of each device responsive to sampling signals for producing output pulses corresponding to the impedance states of said devices during said predetermined interval.

5. A signal store according to claim 4 further comprising coupling means connected to said pulse generating means and jointly responsive to said pulse and a first occurring sampling signal for indicating the presence of stored signals in said devices, and means responsive to the operation of said indicating means for applying second occurring sampling signals to each of said plurality of coupling means.

6. A signal store according to claim 5 wherein each of said plurality of coupling means comprises a saturable magnetic device having at least first and second conductors and a control winding; the control winding being connected to said second terminal; the first of said conductors being connected to said sampling signal applying means and the second of said conductors being connected to a utilization device; said saturable magnetic device being operative, in response to the high impedance state of the connected device, in an unsaturated condition; and being operative, in response to the low impedance state of the connected device, in a saturated condition.

7. A signal receiver comprising means for converting incoming signals into a plurality of binary signals corresponding to a code, a signal store responsive to said binary signals for storing said code for a predetermined time, means for applying repetitive signals to said store to determine the presence of said code, and means responsive to said determination for applying sampling signals to said store to produce output pulses corresponding to said code, said signal store comprising a plurality of two terminal controlled switches, a pulse generator responsive to said incoming signals for generating a pulse of predetermined duration, means for applying said binary signals to one terminal of said controlled switches to selectively close said controlled switches, and means for applying said predetermined duration pulse to said one terminal of each of said controlled switches to maintain said selectively closed controlled switches closed for said predetermined time.

8. A signal receiver according to claim 7 wherein said incoming signal converting means comprises register means for producing a plurality of binary signals in accordance with said code, and said store further comprises means jointly responsive to said repetitive signals and the occurrence of said predetermined duration pulse for indicating the presence of a code in said store.

9. A controlled switch store connected between a signal source and a utilization device for temporarily storing a code corresponding to signals from said source comprising a plurality of two terminal PNPN devices each normally operative in a high impedance state, a pulse generator responsive to the transmission of signals from said source for generating a pulse of predetermined duration, diode means connected between one terminal of each PNPN device and said source for applying signals of a predetermined polarity to each of said one terminals to selectively switch said PNPN devices to low impedance states, diode means connected between said generator and said one terminal of each PNPN device for applying said pulse to each PNPN device to maintain each selectively switched PNPN device in said low impedance state, and means connected to the other terminal of each PNPN device responsive to sampling signals from said utilization device for transferring signals corresponding to said code to said utilization device.

10. A store according to claim 9 wherein said code transferring means comprises a ferrod connected to the output of said pulse generator and jointly responsive to said pulse and a first occurring sampling signal from said utilization device for indicating the presence of a code in said store, and a plurality of ferrods connected between said other terminal of each PNPN device and said utilization device jointly responsive to the current from said PNPN devices and a second occurring sampling signal from said utilization device for applying signals corresponding to said stored code to said utilization device, said second occurring sampling signal being generated in response to the operation of said indicating means.

References Cited

UNITED STATES PATENTS

| | | | |
|---|---|---|---|
| 2,949,504 | 8/1960 | Rubinoff. | |
| 3,018,392 | 1/1962 | Jones | 307—293 |
| 3,197,564 | 7/1965 | Stirling. | |
| 3,400,381 | 9/1968 | Briley | 340—173 |
| 3,011,155 | 11/1961 | Dunlap | 340—173 |

TERRELL W. FEARS, Primary Examiner

U.S. Cl. X.R.

307—88, 284, 294